Sheet 1-3 Sheets.

Hall & Hubner,
Bolt-Heading Machine,
Nº 58,096. Patented Sep. 18, 1866.

Witnesses
Jas. L. Ferguson
W. L. Bennem.

Inventors:
Charles Hall
Emil Hubner
by their Attorney
E. S. Renwick

N. PETERS, PHOTO-LITHOGRAPHER, WASHINGTON, D. C.

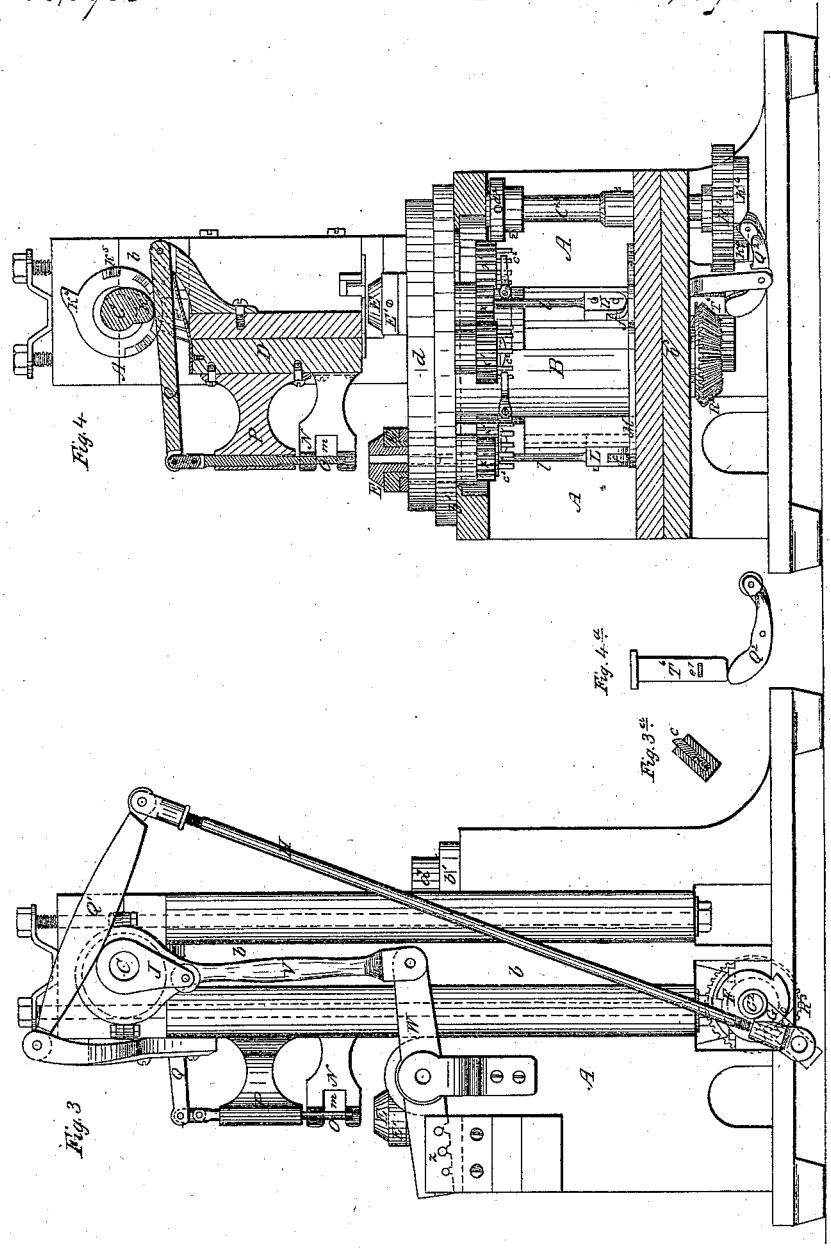

Hall & Hubner,
Bolt-Heading Machine,
N° 58,096. Patented Sep. 18, 1866.
Sheet 3 3 Sheets.
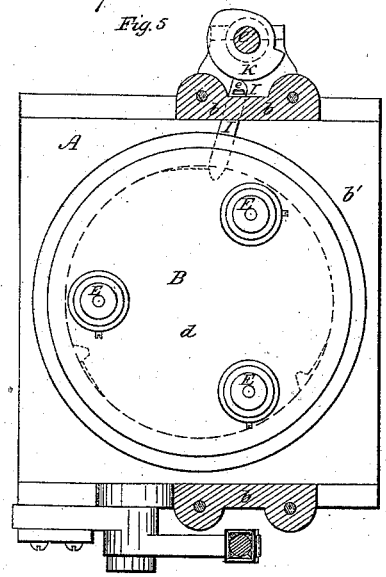
Fig. 5
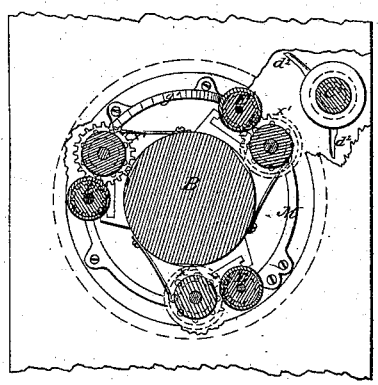
Fig. 6
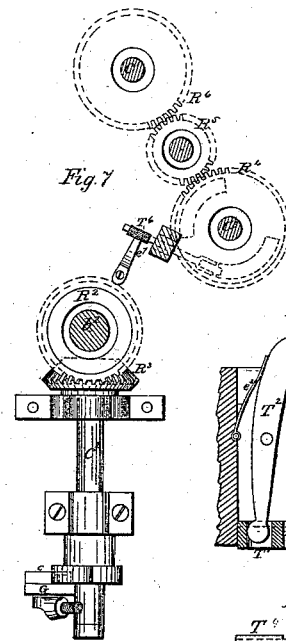
Fig. 7
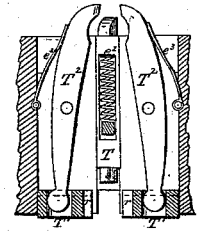
Fig. 8
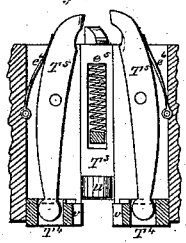
Fig. 9
Fig. 10
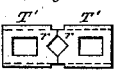
Fig. 10ᵃ
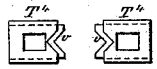
Fig. 11
Fig. 12
Fig. 13
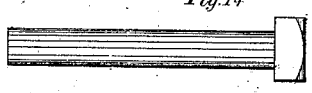
Fig. 14
Witnesses:
Jas. S. Ferguson
W. L. Kenrick
Inventors:
Charles Hall
Emil Hubner
by their attorney
E. S. Kenrick

UNITED STATES PATENT OFFICE.

CHAS. HALL AND EMIL HUBNER, OF NEW YORK, N. Y.

IMPROVEMENT IN BOLT-HEADING MACHINES.

Specification forming part of Letters Patent No. 58,096, dated September 18, 1866.

*To all whom it may concern:*

Be it known that we, CHARLES HALL and EMIL HUBNER, of the city, county, and State of New York, have invented certain new and useful Improvements in Machines for Making Bolt-Blanks and similar articles; and we do hereby declare that the following is a full, clear, and exact description of the same, reference being had to the accompanying drawings, in which—

Figure 1:
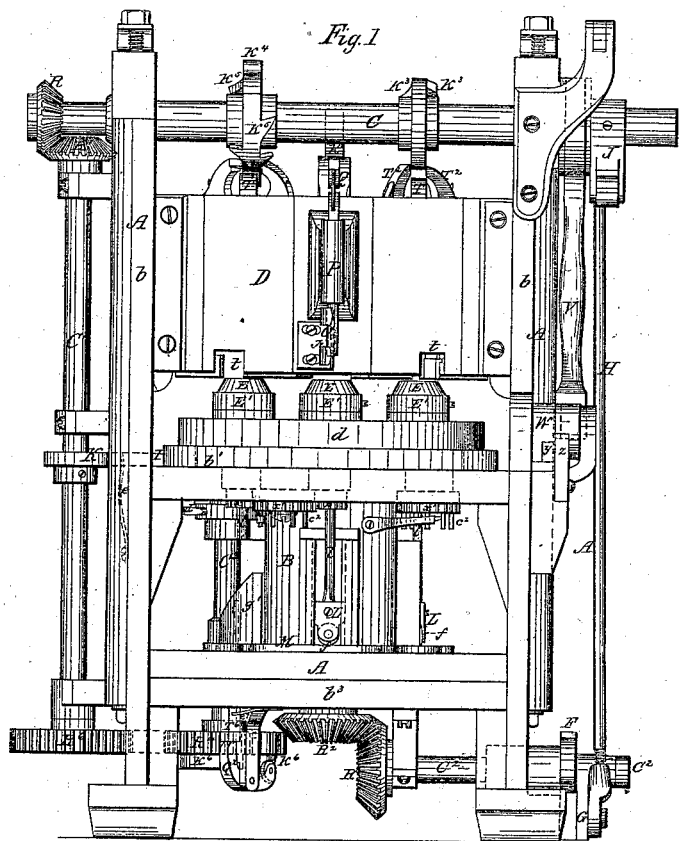
Figure 2:
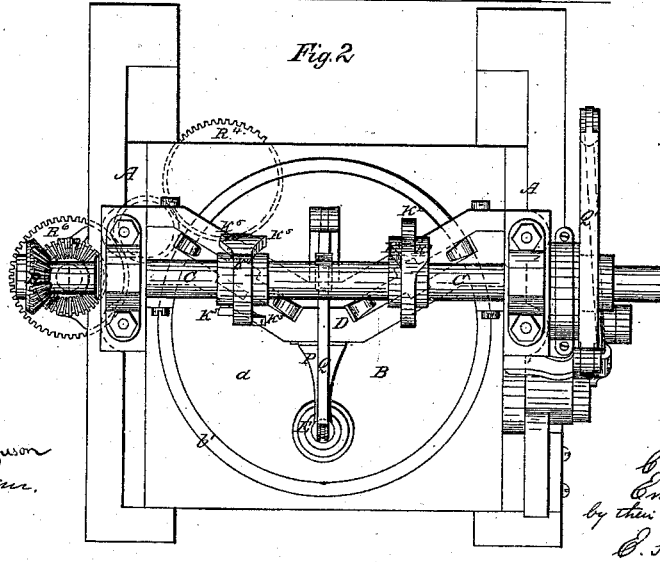

Figure 1 represents a front elevation of a machine embodying our invention. Fig. 2 represents a plan of the same. Fig. 3 represents a side view of the same. Fig. 4 represents a vertical transverse section of the same. Fig. 5 represents a horizontal section of the same at the line $x\ x$ of Fig. 4. Fig. 6 represents a similar section at the line $y\ y$ of Fig. 4. Fig. 7 represents a plan of the mechanism beneath the bottom plate of the machine. Fig. 8 represents a vertical section of the slide-block, showing the levers and slides of the dies for forming the preparatory head upon the blank. Fig. 9 represents a similar section, showing the levers and slides of the dies for finishing the head of the bolt-blank. Figs. 10 and 10ª represent plans of the slides of the lateral or socket dies of the preparing-dies in the different positions. Fig. 11 represents a plan of the lateral slides or side hammers of the finishing-dies; and Figs. 12, 13, and 14 represent views of a bolt-blank of the natural size in different stages of its formation.

The heads of many bolts used in the mechanical arts are much larger in diameter than the stems of the bolts, and such bolts are frequently made of metal rods of the size of their stems by compressing the metal in the direction of the length of the rod, or "upsetting" it, as this operation is technically termed, so as to cause it to expand in diameter or swell.

In a preceding patent granted to us, we described mechanism for manufacturing such bolt-blanks from rods by first forming a preparatory or drum head of less diameter than the finished head upon the bolt-blank, and then imparting the finished form to the preparatory head so made. We also described the mode of presenting the bolt-blank in succession to the preparing and finishing or heading dies by means of a carriage fitted with one or more tubular dies carrying the bolt-blank. We also described the mechanism for gaging the extent of the projection of the end of the bolt-blank above the tubular die, which projection is to be formed into the head, and also the means of inserting the blank into the tubular die and of ejecting it therefrom when the head has been finished by the operation of the machine.

The machine in which our invention was then embodied was designed to produce bolt-blanks with pressed or rivet-formed heads.

The improvements which constitute the subject-matter of the present patent have for their object the adaptation of our preceding invention to the formation of bolt-blanks with polygonal heads, whether square or six or eight sided.

In the operation of our improved machine, a straight piece of metal, such as is shown at Fig. 12, previously cut from a rod of uniform section throughout and heated to a white heat, is presented to the machine by an attendant, and is received in a tubular die, which holds it and presents it in succession to a set of preparing-dies and to a set of finishing-dies. The preparing-dies upset the end of the rod in a socket or mold, so as to form a symmetrical head, such as is shown at Fig. 13, approximating in form the finished head, but of less diameter and greater thickness, while the heading or finishing dies upset the preparatory head produced by the preparing-dies, thereby causing it to expand in diameter and impart to it the finished form, such as is shown at Fig. 14. After the head is thus completed the bolt-blank is ejected from the machine.

The first part of the invention consists of the combination of the tubular die (which holds the piece or blank) and the carriage (by the movement of which the preparing and finishing dies are permitted to act in succession upon the piece of metal or blank) with a set of preparing-dies, and with a set of finishing-dies, consisting of an upsetting-die for upsetting the head and two side dies for imparting the finished polygonal form to the sides of the head.

The second part of the invention consists of the combination of an upsetting die or punch and side dies for forming the head of the blank with a turning tubular die or equivalent device for turning the blank on its axis, and with cam-tappets, or their equivalents, for operating the side dies and upsetting-die, arranged in such manner that the former are operated twice for each operation of the latter, whereby the symmetrical form of the bolthead is insured.

The third part of the invention consists of the combination of the die or dies for forming the head of the blank and the turning tubular die, or its equivalent, for turning the blank upon its axis, with a carriage to present the blank to the said heading die or dies and remove it therefrom.

The fourth part of the invention consists of the combination of a holder or tubular die for holding the bolt-blank during the heading and the upsetting or punch die for compressing the head of the bolt-blank endwise with a gage and cam, or their equivalents, for protruding the blank from the tubular die while it is opposite the upsetting-die and permitting it to move farther into the tubular die, whereby, when the upsetting-die is caused to act upon the blank, the under side of the head of the blank is driven forcibly against the face of the tubular die in which it is sustained, the tendency of which operation is to cause the metal in the vicinity of the under side of the head of the blank to spread laterally equally with the metal in the vicinity of the top of the head.

The fifth part of the invention consists of the combination of a holder or tubular die for holding the bolt-blank during the heading and side dies for acting upon the sides of the head with a gage and cam, or their equivalents, for protruding the blank from the tubular die during the operation of the side dies, so that the sides of the head may be overlapped by the side dies when they operate, whereby the formation of a fin at the under side of the head is avoided.

The sixth part of the invention consists of the combination of a holder or tubular die for holding the bolt-blank during heading and a gage and cam, or their equivalents, for protruding the blank and permitting it to move into the tubular die, with both an upsetting-die and side dies for forming the head, whereby the same movements of the gage and cam are made use of to move the blank for the successive operations of both the upsetting-die and side dies.

The seventh part of the invention consists of the combination of a holder or tubular die for holding the blank during heading, the die or dies for operating upon the head of the blank, and a gage and cam, or their equivalents, for protruding the blank and permitting it to move into the tubular die, as aforesaid, with a carriage to present the blank to the said dies and remove it therefrom.

The eighth part of the invention consists of the combination, in the same machine, of the die or dies for operating upon the head of the blank with both the aforesaid turning tubular die or holder and the aforesaid gage and cam.

The ninth part of the invention consists of the arrangement of the preparing and finishing dies in two diverging lines extending radially from the axis upon which the carriage turns, the dies of each set being at the same side of that axis, so that the openings in the slide-block for the passage of the bolt-blank to and from the dies may be made directly across it instead of being skewed.

The machine represented in the accompanying drawings embodies our present invention, as well as the original invention set forth in our aforesaid preceding patent. Its various moving parts are supported by a strong frame, A A, whose standards $b\ b$ terminate at their upper ends in pillow-blocks, in which the cam-shaft C, that operates the preparing and heading or finishing dies, is sustained. Below this cam-shaft is the slide-block D, which supports and guides the slides of the preparing and finishing dies; and below this slide-block is the carriage B, which holds the tubular dies and their appurtenances. This carriage has a disk-head, $d$, at its upper end, in which the tubular dies E E E are sustained, and which is constructed to turn in a circular opening formed in the cross-plate $b'$ of the frame of the machine. The tubular dies are arranged at equal distances from the center of the carriage-head, and also at equal distances from each other, so that the turning of the carriage a third of a revolution at a time places each tubular die successively in the same three positions.

The lower end of the carriage is provided with a journal, $b^2$, which extends through a bearing formed in the bridge-plate $b^3$ of the frame, and terminates in a driving end, to which a miter-wheel, $R^2$, is secured. The teeth of this miter-wheel engage with those of a second miter-wheel, $R^3$, secured to a horizontal shaft, $C^2$, which is supported in bearings secured to the frame, and is fitted at its outer end with a ratchet-wheel, F, of three teeth.

The end of the shaft also forms the pivot of a vibrating arm, G, carrying a spring-pawl, $e$, to act upon the ratchet-teeth; and this arm is connected by a rod, H, with a lever, $Q'$, pivoted to the upper part of the frame of the machine in the proper position to be acted upon by a revolving arm, J, secured to the cam-shaft C, so that at each revolution of the cam-shaft C the swinging arm, with its pawl, is caused to pull round the horizontal shaft $C^2$, and through it and the miter-wheels $R^2$ $R^3$ turn the carriage B a third of a revolution.

In order that the carriage may be held stationary after each movement until it is to be moved again, the rim of its disk-head has three tapering sockets formed in it, as seen in dotted lines at $C'$ in Fig. 5, at equal distances apart, and a stop, I, is constructed to slide into the cross-plate $b'$ of the frame in the proper position to engage with one of the three sockets when the carriage is at rest. This stop is moved toward the carriage by a cam, K, secured to an upright shaft, C', which is supported in bearings at the side of the machine, and is connected at its upper end with the cam-shaft C by miter-wheels R R', so that it is caused to turn in correspondence therewith. The end of the stop I is wedge formed, and the sockets are tapering, so that the effect of the insertion of the stop into the socket opposite it is to bring the carriage to the exact position it should occupy in case the operation of the pawl has not left it there.

A part of the cam K is concentric, so that the stop is retained in the socket in which it is engaged for a period long enough to permit the preparing and finishing dies to operate, after which the form of the cam permits the stop to be withdrawn by a spring, $e$, which acts antagonistically to the cam, to permit the carriage to be turned anew.

The sockets and the teeth of the ratchet-wheel F are so arrrnged relatively to the tubular dies E that when the movement of the carriage is stopped one of the tubular dies is directly in front of the slide-block D, while the other two are beneath it.

The bore of each tublar die is just sufficient to admit the stem of the piece of rod of which the headed bolt-blank is to be formed. Each bore is fitted with a movable gage, $l$, which projects upward into it from a small carriage, L, beneath. Each of the gage-carriages is arranged to slide up and down in a groove formed in the carriage B, and each is fitted with a wheel, $f$, which runs upon a circular track, M, provided with a cam, $g'$, which causes the gages to enter the bores of the tubular dies a sufficient distance to eject the blank, as will be hereinafter described.

In order that the straight blank may be inserted truly into the front tubular die, E, a guide, N, is provided. This guide has an upright V-formed groove in it, and it is supported directly over the front die in such position that when the straight piece is placed in the groove by the attendant its axis is directly in the line of the bore of the tubular die beneath. The guide has an opening, $m$, in it to admit the jaws of the tongs by which the straight piece is presented to the guide. In order that the piece so presented may be inserted into the tubular die, a piston, O, is provided to push it downward. This piston is arranged to slide vertically in a bracket, P, and its upper end is connected with the end of a lever, Q, which is moved downward to depress the piston and push the piece into the tubular die by a cam, K', secured to the cam-shaft C. When the cam in its revolution has passed by the lever it is raised to lift the piston by means of a spring, $e'$.

The preparing-dies for forming the preparatory or drum head upon the bolt-blank consist of two lateral dies, $r$ $r$, and an upsetting or punch die, $s$. The punch-die $s$ is secured to a slide, T, which is arranged to slide vertically in the slide-block D, and it is operated by means of the cam $K^2$, secured to the cam-shaft C. The lateral dies $r$ $r$ are secured to slides T' T', which are arranged to move horizontally (toward and from the axis of the punch-die) in grooves formed in the lower side of the slide-block D. The faces of these two lateral dies, when moved together, form a socket (see Fig. 10ª) of the size and form of the preparatory head to be formed upon the bolt-blank. These lateral socket-dies are caused to converge by means of a pair of upright levers, $T^2$ $T^2$, which are pivoted in the recess of the slide-block, with their lower ends in sockets in the slides of the lateral dies $r$ $r$, and with their upper ends within the range of motion of a pair of cams, $K^3$ $K^3$, secured to the cam-shaft C. When the cams have ceased to act the lateral dies are caused to diverge by the action of springs $e^3$ $e^3$ upon their levers $T^2$ $T^2$.

As the socket formed by the lateral or socket dies, when converged, should be made ready before the end of the blank is upset in it, the lateral cams $K^3$ $K^3$ are so arranged relatively to the cam $K^2$ of the punch-die as to move the lateral dies to their converged positions before the punch-cam $K^2$ depresses the punch-die $s$ materially. The faces of the lateral cams $K^3$ $K^3$ are also made of uniform projection for a sufficient distance around the cam-shaft C to hold the lateral dies at rest in their converged positions until the punch-die has completed its work. When the punch-die has done its work its slide T is raised by means of a spring, $e^2$, the form of the punch-cam $K^2$ then permitting such movement.

The finishing-dies, or heading-dies proper, consist, in the present machine, of three members—an upsetting or punch die, for upsetting the end of the preparatory head formed by the preparing-dies, and two side dies, for imparting the finished form to its sides. The upsetting-die $u$ is secured to a slide, $T^3$, arranged to slide vertically in the slide-block D, and operated by a set of cam-tappets, $K^4$, carried by the cam-shaft C. The face of this upsetting-die is the counterpart of the upper side of the head of the finished bolt-blank, being flat or concave, as required. This upsetting-die is withdrawn from the blank after each of its tappets have acted by means of a spring, $e^5$, which acts upon its slide.

The slide-dies $v$ $v$, or "hammers," as they may be called, are secured to a pair of slides, $T^4$ $T^4$, which are arranged to move horizontally (toward and from the axis of the upsetting-die) in grooves formed in the lower side of the slide-block D. The face of these two side dies, when converged to their nearest positions, correspond with the forms of the faces of the finished head to be formed upon the bolt-blank. These side dies are caused to converge simultaneously by means of a pair of upright levers, $T^5$ $T^5$, which are pivoted in the recess of the slide-block, with their lower ends in sockets in the slides of the side dies $v$ $v$, and with their upper ends within the range of motion of two sets of cam-tappets, K⁵ K⁵, secured to the cam-shaft C. The side dies are caused to diverge whenever the cam-tappets cease to act by means of springs $e^6$ $e^6$ acting upon their levers T⁵ T⁵.

The cam-tappets of the upsetting-die and those of the side dies are so arranged relatively to each other that the upsetting-die and side dies are caused to act alternately upon the bolt-blank head, and, for a reason hereinafter stated, each operation of the upsetting die alternates with two operations of the side-dies or hammers. Hence the preparatory head is first upset by the upsetting-die, and then pressed or hammered twice sidewise by the side dies, after which these operations are repeated.

In order that the finished head may be symmetrical, the bolt-blank is turned partly round upon its axis between the two consecutive operations of the heading-dies, this operation being effected by turning the tubular die, in which it is supported, the required amount. For this purpose each tubular die E is fitted into a tubular die-holder, E′, which is constructed to turn in a bearing secured in the disk-head $d$ of the carriage B, and the lower end of each tubular die is fitted (beneath the disk-head of the carriage) with a cog-wheel, $x$, whose teeth engage with those of a corresponding wheel, $x'$, of larger diameter, that is pivoted to the under side of the carriage-head $d$. The larger wheel is provided with a set of pins, $c^2$, arranged at equal distances apart, and these pins project downward, as seen at Figs. 1 and 4, so that they may be acted upon by a pair of radial arms, $d^2$, which project from an upright shaft, C³. This shaft C³ is supported in bearings in the cross-plate $b'$ and bridge-plate $b^3$ of the frame at one side of the carriage B, so that its arms $d^2$, when turned, can act against the pins $c^2$ of the wheel $x'$, corresponding with that one of the tubular dies E which is beneath the finishing-dies. The lower end of this arm-shaft C³ is connected by cog-wheels R⁴ R⁵ R⁶ with the upright shaft C′, so that the turning of the cam-shaft C imparts motion, through the miter-wheels R′ R, upright shaft C′, and cog-wheels R⁴ R⁵ R⁶, to the arm-shaft C³, and causes it to turn simultaneously with the cam-shaft C, and its arms $d^2$ to act upon the pins $c^2$ and turn the tubular die, with which they are connected by the cog-wheels $x'$ $x$. The relative numbers of teeth in the wheels $x'$ and $x$ are such and the arms $d^2$ are so arranged that the action of these arms $d^2$ upon the pins $c^2$, and the consequent turning of the tubular die and the bolt-blank within it, take place between the consecutive actions of the side dies $v$ $v$, and also between the consecutive actions of the upsetting-die $u$.

As the side dies represented in the present machine are adapted to the formation of square heads, the wheels $x$ $x'$ and pins $c^2$ are adapted to turning the tubular die a quarter of a revolution. If a six-sided head be required, they should be adapted to turning the tubular die a third of a revolution at a time; or they might be adapted to turning it only one-sixth of a revolution, if preferred.

In cases where but a small amount of turning is required the pins $c^2$ may be secured directly to a hub upon the tubular die-holder E′, and the two cog-wheels $x$ $x'$ may then be dispensed with.

The operation of the side dies is to compress the metal crosswise to the bolt-blank. As these dies cannot be made in practice to slide so closely to the upper side of the tubular die, as to prevent the metal of the head, when compressed in contact with the tubular die, from escaping a little at the joint between the top of the tubular die and the under sides of the side dies, and forming a fin, we have devised means by which the formation of such a fin may be prevented. In order to accomplish this, the gage $l$, upon which the end of the bolt-blank is supported, is raised before each convergence of the side dies, so as to protrude the bolt-blank from the tubular die until its head is overlapped both above and below by the solid faces of the side dies, so that there is then no horizontal joint at the side of the head through which the metal can protrude to form a fin. The gage $l$ is raised at the proper times by means of two cams, K⁶ K⁶, which are secured to the under side of the wheel R⁴ beneath the bridge-plate $b^3$ of the frame, and act through a lever, Q², and slide T⁶, that is arranged to rise and descend beneath the under side of that one of the gage-carriages L which is beneath the finishing-dies, the upper end of the slide T⁶ being a section of the track M, upon which the wheels of the gage-carriages run.

Each of the cams K⁶ is of sufficient length to hold the bolt-blank in its raised position during two consecutive actions of the side dies, but permits it to descend or move into the tubular die whenever the upsetting-die operates, so that the under side of the head may then receive its form from the face of the tubular die E, against which it is forced by the descent of the upsetting-die $u$. The descent of the slide T⁶ may be insured by a spring, $e^7$, which acts antagonistically to the cams K⁶ K⁶.

In order to permit the end of the blank projecting from the tubular die to pass into and out of the space between the preparing-dies, and to permit the preparatory head to pass into and out of the space between the finishing-dies, openings $t$ are made through the under side of the slide-block D, and the side dies and upsetting-dies of each set are arranged in a line extending radially from the axis of the carriage B, so that the parts of the slide-block which sustain the two sets of dies may also be radial, and that the openings through them for the passage of the projecting end or head of the bolt-blank may be directly across them, instead of skewing, the effect of which would be to require considerable portions of the grooves of the lateral and side dies to be cut away, and also to require the side dies to be separated a greater distance than is necessary with the radial arrangement. After the head is finished, the movement of the carriage causes the gage carriage to rise the incline of the cam $g'$, secured in the track M, upon which the wheels of the gage-carriages run, and thereby eject the bolt-blank.

For the convenience of the workmen we have added to the machine a pair of shears for cutting off the bolt-blanks from the rods. The fixed knife $z$ of this shears is secured to the frame of the machine. The movable knife $y$ is secured to a lever, W, to which a reciprocating motion is imparted by an eccentric and eccentric-rod V, the former being secured to the cam-shaft C. The fixed knife of the shears has a series of holes in it, and the movable knife has notches in it to fit the sizes of the rods to be cut, so that the cut may not materially disfigure the end of the rod.

Instead of making the faces of the socket-dies $r\ r$ so that when converged they form a square socket, they may be made of any other form that it is desirable should be imparted to the preparatory head previous to the operation of the finishing-dies, and these dies may be made to impart a polygonal form to the neck of the bolt-blank, as described in our said preceding patent. The two socket-dies may be replaced by a single socket or box die, having a socket or box in it of the required form, and combined with mechanism to lower it over the projecting end of the blank in the tubular die before the upsetting or punch die descends, and to raise it from the preparatory head before the punch-die is withdrawn. Such a die would be the equivalent of the two lateral or sectional socket-dies in the combinations of which they form part, but might be preferred by some constructors.

Instead of constructing the carriage to turn upon its axis, it may be constructed to move to and fro beneath the dies in a straight line. In this case there would be but one tubular die, which would be moved successively beneath a piston, (to insert the blank,) the preparing-dies, and the heading-dies, and would then be drawn back to receive a new blank. The axial lines of the piston, preparing-dies, and heading-die would also all be in the same plane.

Instead of arranging the tubular dies upon the carriage and the preparing and heading dies upon the stationary frame of the machine, the slide-block holding the preparing and heading dies may be secured to a carriage, and the tubular dies may be arranged upon a fixed part of the frame. In this case the dies would move over the bolt-blanks in succession, and the movement of the carriage be stopped long enough to permit the dies to act. As, however, the bolt-blank would not be carried over the ejecting-cam, it would be necessary to move the cam beneath the blank, so as to eject it from the tubular die. The same arrangement might be applied to a machine with a carriage reciprocating in a straight line, as hereinbefore described.

The movement of the punch-die which upsets the metal into the socket-dies should be sufficient to make the metal fill up the socket, so that the lower side of the preparatory or drum head formed thereby bears firmly upon the face of the tubular die when the heading upsetting-die does its work. Hence, when the heading upsetting-die begins to upset the metal, the latter, having a base which is supported by the face of the tubular die, cannot incline to one side, but is, of necessity, caused to expand equally at all sides and to form a symmetrical head.

In some cases it may be expedient to construct the side-finishing dies with flat faces, so that each may impart form to but one side of the head at a time. In some cases it may also be deemed expedient to apply springs to force the side dies toward the bolt-blank, and to arrange the cams to withdraw them therefrom. In such cases the side dies will strike blows like true hammers, the force of the blows being determined by the strength of the springs employed.

In our preceding description we have described levers for the purpose of imparting motion to the side-finishing dies and socket-dies; but we do not limit our invention to that method of transmitting motion, as other modes may be used advantageously. For example, the side dies (whether preparatory or finishing) may be advanced or conveyed by means of wedge-formed slides inserted between the butts of the die-slides and the sockets of the slide-block in which they move. The opening of the dies may be effected by inclined grooves in the same wedge-formed slides acting upon projections secured to the die-slides. In some cases it may be desirable to gripe the neck of the bolt-blank during the formation of the head. In such cases the tubular die may be formed of two or more sections, which may be caused by suitable mechanism to converge upon the blank in manner similar to the convergence of the side dies hereinbefore described; and after the necessity for griping has ceased, the said sections may be withdrawn from the blank, by springs or otherwise, in manner similar to the withdrawal of the side dies hereinbefore described.

Parts of our invention may be used in machines for making bolt-blanks or similar articles which do not contain other parts thereof, and we contemplate such use of them whenever circumstances render it expedient. For example, either the upsetting-die or the side dies, or both, may be used in a machine having a turning tubular die or holder without the movable gage and cam for protruding the blank from the holder. So, also, either the upsetting-die or the side dies, or both, may be used in a machine fitted with a gage and cam operating in connection with a fixed tubular die, instead of a turning one. Again, a turning holder or turning tubular die for turning the blank upon its axis may be used in a machine having only an upsetting or punch die for forming the head of the blank, (without side dies,) and it may also be used in a machine having side dies for forming the head of the blank without an upsetting-die. The gage and cam, or their equivalents, for protruding the blank from its holder, and for permitting it to move inward therein for the operation of the dies, may be used in the same manner with either kind of heading-die alone. So, also, the instrumentalities for turning the bolt upon its axis, and for protruding it for the operation of either or both kinds of heading-dies, may be used separately or conjointly in machines which form the bolt-head directly upon the blank without first forming a preparatory head. These instrumentalities may also be used in machines which do not contain a carriage, but hold the tubular die or blank holder in one place during the formation of the head.

Having thus described a machine embodying our improvements, what we claim as our invention, and desire to secure by Letters Patent, is—

1. The combination, in a bolt-blank machine, of the following instrumentalities, viz: the tubular die, carriage, preparing-dies, and set of finishing-dies, consisting of an upsetting-die and side dies, substantially as set forth.

2. The combination, in a bolt-blank machine, of the following instrumentalities, viz: the upsetting-die, side heading-dies, turning tubular die, and cam-tappets, which operate the side heading-dies twice for each operation of the upsetting-die, substantially as set forth.

3. The combination, in a bolt-blank machine, of the following instrumentalities, viz: the heading die or dies, turning tubular die, and carriage, substantially as set forth.

4. The combination, in a bolt-blank machine, of the following instrumentalities, viz: the tubular die, upsetting-die, gage, and cam, substantially as set forth.

5. The combination, in a bolt-blank machine, of the following instrumentalities, viz: the tubular die, side dies, gage, and cam, substantially as set forth.

6. The combination, in a bolt-blank machine, of the following instrumentalities, viz: the tubular die, upsetting-die, side dies, gage, and cam, substantially as set forth.

7. The combination, in a bolt-blank machine, of the following instrumentalities, viz: the heading die or dies, tubular die, gage, and cam, and carriage, substantially as set forth.

8. The combination, in a bolt-blank machine, of the following instrumentalities, viz: the heading die or dies, turning tubular die, gage, and cam, substantially as set forth.

In testimony whereof we have hereunto set our hands this 3d day of May, A. D. 1865.

CHARLES HALL.
EMIL HUBNER.

Witnesses:
 E. S. RENWICK,
 W. L. BENNEM.